United States Patent [19]
Macchiarulo et al.

[11] Patent Number: 5,217,562
[45] Date of Patent: Jun. 8, 1993

[54] MACHINE FOR COILING AND WINDING TUBULAR SLEEVES OF ELASTOMERIC MATERIAL INCORPORATING REINFORCING FIBERS

[75] Inventors: Vincenzo Macchiarulo, Pescara; Federico Squerti, Milan, both of Italy

[73] Assignees: Pirelli Transmissioni Industriali S.p.A., Chieti; Pirelli Prodotti Diversificati S.p.A., Milan, both of Italy

[21] Appl. No.: 793,840

[22] Filed: Nov. 21, 1991

[30] Foreign Application Priority Data

Nov. 21, 1990 [IT] Italy .............................. 22 124 A/90

[51] Int. Cl.⁵ ............................................. B65H 81/00
[52] U.S. Cl. ................................... 156/362; 156/111; 156/137; 156/171; 156/396; 156/425; 156/567; 29/430
[58] Field of Search ............... 156/111, 137, 567, 425, 156/396, 428, 429, 430, 172, 173, 171, 362, 366; 29/430

[56] References Cited

U.S. PATENT DOCUMENTS

| | | | |
|---|---|---|---|
| 3,791,897 | 2/1974 | Mesly | 156/568 X |
| 4,024,006 | 5/1977 | Gray | . |
| 4,105,487 | 8/1978 | Suzuki et al. | 156/132 X |
| 4,105,488 | 8/1978 | Hayes et al. | 156/137 X |
| 4,197,155 | 4/1980 | Hursell, Sr. | 156/111 X |
| 4,710,255 | 12/1987 | Takeuchi et al. | 156/425 X |
| 4,933,033 | 6/1990 | Bailey | 156/111 |
| 5,061,339 | 10/1991 | Nakagaki | 156/396 X |

FOREIGN PATENT DOCUMENTS

0212033 3/1987 European Pat. Off. .
2188280 9/1987 United Kingdom .

*Primary Examiner*—Jeff. H. Aftergut
*Attorney, Agent, or Firm*—Stevens, Davis, Miller & Mosher

[57] ABSTRACT

In the apparatus of this invention a plurality of cylindrical matrices 2 are used to form tubular sleeves of elastomeric material to be later cured and cut into short segments to be used as belts, usually toothed belts. A coiling station 8 places a reinforcing fiber helically around the entire length of the sleeve. The matrix having the coils is then turned to a vertical position by a transfer member 28 and transferred, by means of an adjacent rotating platform 6 to a winding station 9 for application of a sheet of elastomeric material over the thread. The matrix having the completed but uncured sleeve is then placed back on the rotating platform. The coiling station and the winding station each have a tilting member 34 or 43 with two pairs of arms 39 or 52 so that while a completed matrix is swung out of the working position, a fresh matrix is swung into position.

10 Claims, 4 Drawing Sheets

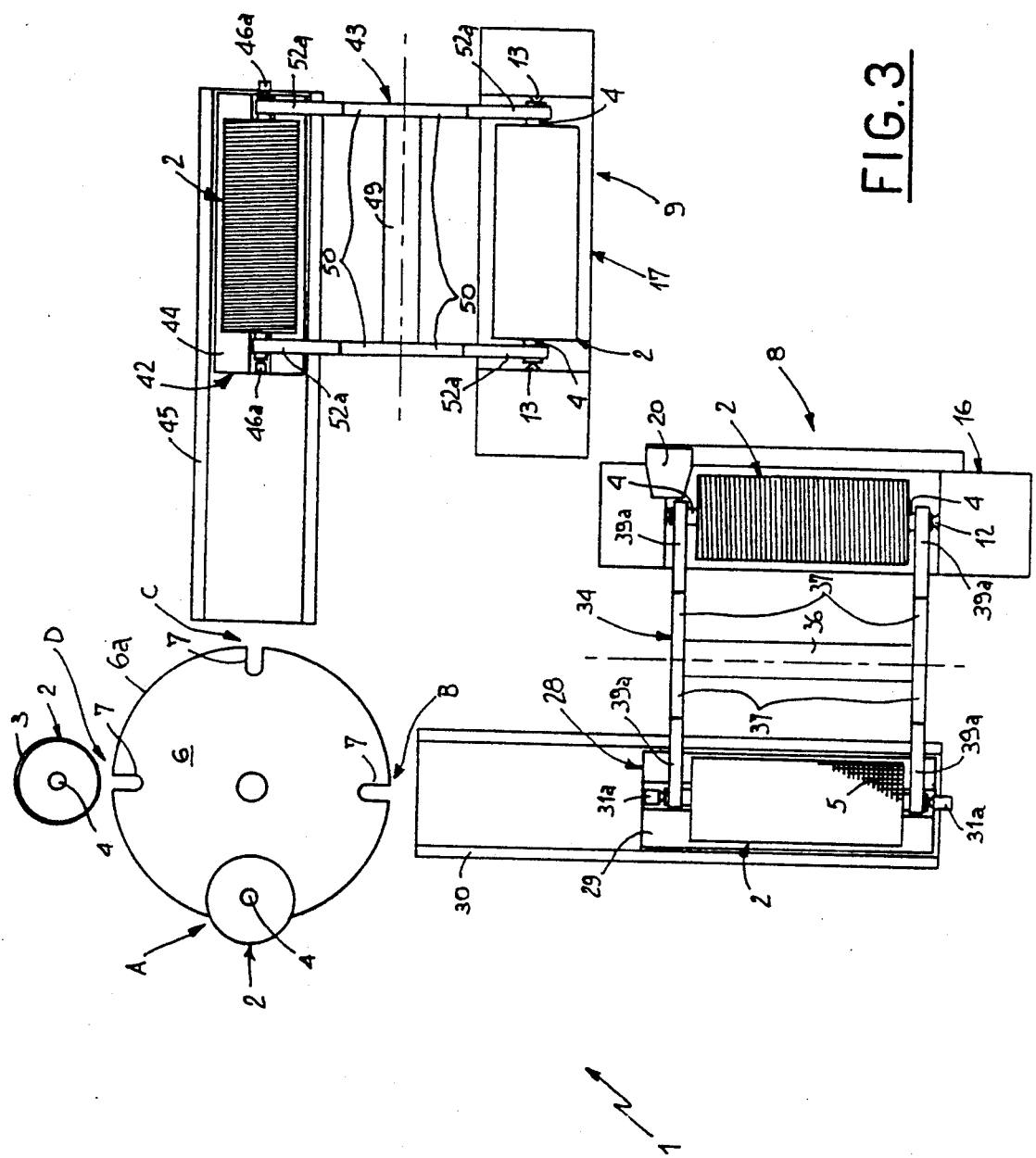

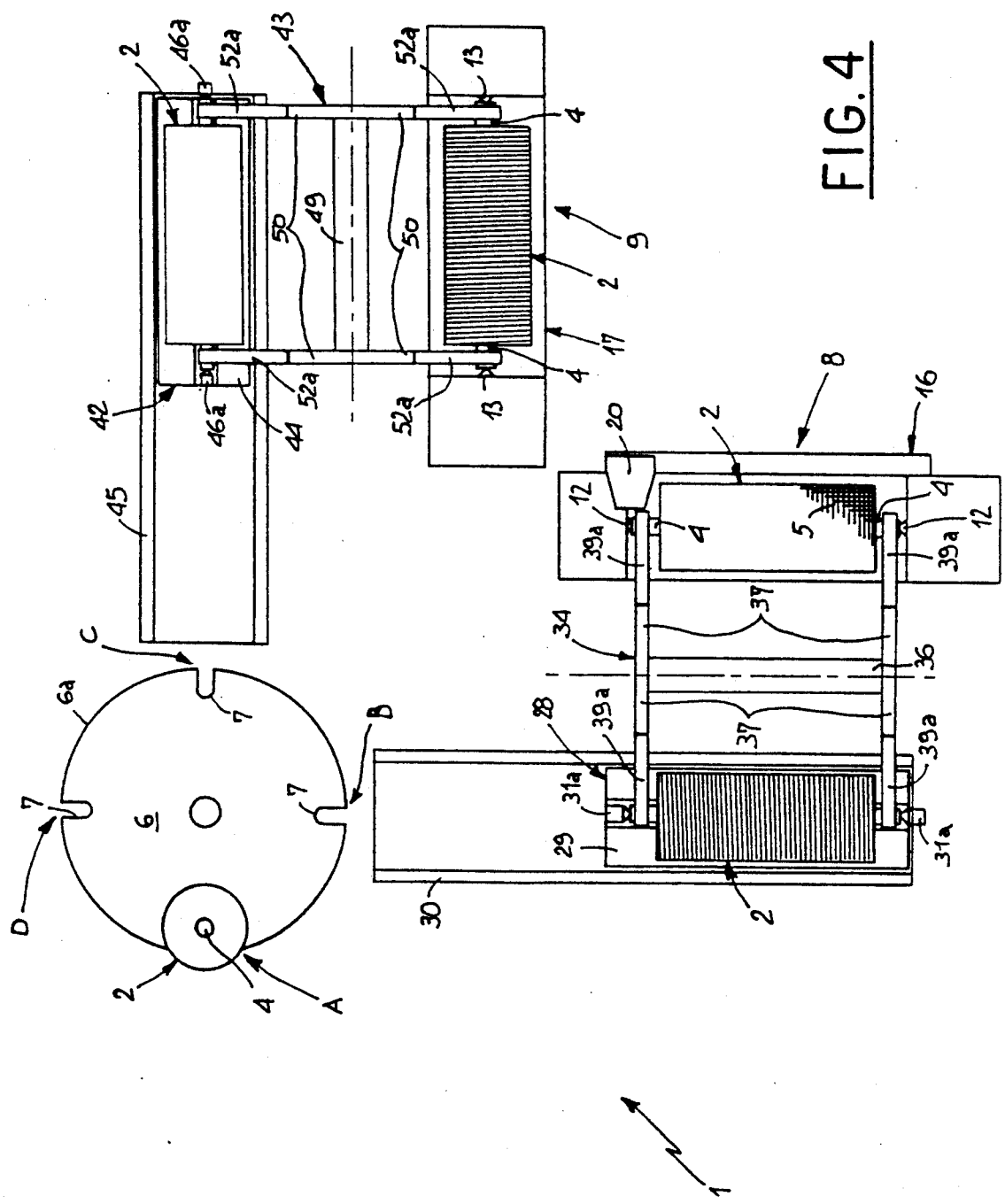

MACHINE FOR COILING AND WINDING TUBULAR SLEEVES OF ELASTOMERIC MATERIAL INCORPORATING REINFORCING FIBERS

CROSS REFERENCE TO RELATED APPLICATIONS

Copending U.S. application Ser. No. 07/792,876, filed on even date herewith and corresponding to:

Italian Application 22 121 A/90, filed Nov. 21, 1990 for PROCESS AND APPARATUS TO APPLY IDENTIFICATION INSCRIPTIONS ON SLEEVES MADE OF ELASTOMERIC MATERIAL IN THE MANUFACTURE OF DRIVING BELTS.

Copending U.S. application Ser. No. 07/793,731, filed on even date herewith and corresponding to:

Italian Application 22 123 A/90, filed Nov. 21, 1990 for PROCESS AND APPARATUS FOR HANDLING DRIVING BELTS IN AN AUTOMATED MANNER.

Copending U.S. application Ser. No. 07/793,732, filed on even date herewith and corresponding to:

Italian Application 22 125 A/90, filed Nov. 21, 1990 for PROCESS AND APPARATUS FOR THE INSPECTING JUNCTIONS IN SLEEVE LINING FABRICS FOR THE MANUFACTURE OF TOOTHED BELTS.

Copending U.S. application Ser. No. 07/793,733, filed on even date herewith and corresponding to:

Italian Application 22 126 A/90, filed Nov. 21, 1990 for PROCESS AND APPARATUS TO IDENTIFY THE PRESENCE OF STRUCTURAL CAVITIES IN SLEEVES FOR THE MANUFACTURE OF DRIVING BELTS.

Copending U.S. application Ser. No. 07/792,880, filed on even date herewith and corresponding to:

Italian Application 22 127 A/90, filed Nov. 21, 1990 for PROCESS AND AUTOMATIC INSTALLATION FOR THE CONTROL OF THE QUALITY AND OF THE PRODUCTION OF TRANSMISSION BELTS.

Copending U.S. application Ser. No. 07/793,729, filed on even date herewith and corresponding to:

Italian Application 22 128 A/90, filed Nov. 21, 1990 for A PROCESS AND APPARATUS FOR INSPECTING THE GEOMETRICAL CONFIGURATION OF TOOTHED DRIVING ELEMENTS.

The disclosure of each of the above identified U.S. Applications are hereby incorporated by reference.

BACKGROUND OF THE INVENTION

The present invention relates to a machine and a process for coiling and winding tubular sleeves of elastomeric material incorporating cords, reinforcing fibers and such like, said machine being of the type comprising:

means for support and operation to engage and operate in rotation on a horizontal axis a cylindrical matrix, on which the sleeve is to be formed;

a coiling unit which slidably engages at least one thread of reinforcing fiber to wind it and distribute it homogeneously over the matrix during the latter's operation in rotation;

a winding unit arranged to feed onto the matrix at least one sheet of elastomeric material to determine its winding on the matrix itself following the rotation of the matrix.

SUMMARY OF THE INVENTION

More in particular, the machine and the process according to the invention are used to make, on suitable matrices, tubular sleeves of the type used in the manufacture of transmission belts, such as V-belts, toothed belts, belts with several longitudinal grooves and such like.

As is known, transmission belts are generally obtained from tubular sleeves which are cut circumferentially along a plurality of equidistant longitudinal spaced lines according to a breadth corresponding to the width of the belts to be obtained.

The manufacture of these sleeves entails the use of suitable cylindrical matrices or drums, generally of a metal material, on which the reinforcing cords and one or more sheets of elastomeric material are wound.

More in particular, strictly by way of example, reference will be made to the manufacture of toothed belts, having teeth and/or longitudinal grooves that alternate and are homogeneously distributed over its cylindrical surface. Such belts are made on a cylindrical matrix upon which there is first slipped a sleeve of rubberized material having a pre-set extendibility in the circumferential direction.

The matrix is then moved to a suitable coiling and winding machine, provided with means of support and operation, generally constituted by centering tailstocks and/or one or more self-centering chucks, which operate on connecting tangs protruding from the opposite extremities of the matrix itself to support and operate the latter in rotation on a horizontal axis.

Once the matrix has been engaged as described above, the intervention of a coiling unit is activated which, coincidental with the operation in rotation of the matrix itself, winds onto the matrix's cylindrical surface, and more accurately onto the textile sleeve, at least one cord or thread of reinforcing fibers of textile or fiberglass material which, at the end of the operation, is homogeneously distributed along the entire length of the matrix.

After coiling has taken place, winding is executed, by means of a winding unit, of at least one sheet of elastomeric material onto the cylindrical surface of the matrix.

This winding unit provides essentially for the presence of one or more rotatable drums carrying a plurality of sheets of elastomeric material having different dimensional and/or functional characteristics, each wound so as to form a roll.

The rolls formed by the sheets are then ready to be selectively positioned over the matrix being processed to allow winding, on the sleeve having fibers wound thereon and carried on the matrix, of one of the elastomeric sheets having the desired dimensional and functional characteristics.

Normally, one of the rolls is a protective sheet of a paper material, which is wound onto the more external elastomeric sheet previously placed on the matrix.

The matrix carrying the tubular sleeve is then ready to be removed from the coiling and winding machine to be carried to an autoclave where the curing of the elastomeric material takes place.

More in particular, during the curing step the elastomeric material is subjected to a centripetal compression which forces it to pass through the layer of cords to permeate and fill grooves which are already in the matrix, so as to define the internal teeth of the belts which shall be obtained later.

Although the current coiling and winding machines carry out their function effectively, it has been observed that, due to their intrinsic nature, they do not fully allow the exploitation of the potential productive capacities which could be obtained from the coiling unit and from the winding unit associated with them.

It should be pointed out in this respect that the winding unit is forced to remain inactive for the entire time necessary for the operation on the part of the coiling unit, and vice versa.

Since the time required for the execution of the coiling and of the winding operations are substantially equal, it follows that the coiling unit and the winding unit are exploited for only half their actual productive capacities.

This aspect, clearly disadvantageous, is multiplied when there is the need of installing more than one winding machine to satisfy requirements of high productivity.

OBJECTIVES OF THE APPARATUS

The main object of the present invention is essentially that of solving the problems of the known art and, in particular, to allow the attainment of a productivity comparable to that of two machines according to the known art, by the execution of coiling and winding in two distinct operating stations, using only one coiling unit and only one winding unit inserted in one and the same machine.

Against this requirement there is the technical problem consisting of finding a solution which reduces to the lowest indispensable level any dead time for the passage of the matrix being processed from the coiling station to the winding station.

Moreover, the solution found must allow for the automatic passage of the matrices being processed with no risk of damage to the sleeve, and in particular to the sheets of elastomeric material in the uncured state.

This object and others as well, which shall appear better during the course of the present description, are substantially attained by a machine for coiling and winding of tubular sleeves in elastomeric material incorporating reinforcing fibers, which comprises:

a coiling station carrying the coiling unit and provided with first means of support and operation for rotation of the matrix;

a winding station carrying said winding unit and provided with second means of support and operation for rotation of the matrix;

a rotating platform arranged so as to engage a plurality of said matrices at respective connecting seats distributed circumferentially on the platform itself according to a predetermined angular pitch, said platform being rotatably operatable on a vertical axis according to an angular pitch equal to the distribution pitch of the connecting seats;

a first transfer member movable from a first operating condition wherein it engages one of the matrices carried by said platform to a second operation condition wherein the matrix engaged by it is positioned side by side with and parallel to a further matrix carried by the coiling station;

a first tilting member operating between the coiling station and the first transfer member in the second operating condition, to engage the matrices carried by the coiling station and by the first transfer member themselves and to exchange their position with one another with a 180° tilting motion;

a second transfer member movable from a first operating condition wherein it engages the matrix previously processed in the coiling station and deposited onto the platform by the first transfer member, to a second operating condition wherein said matrix is positioned side by side with and parallel to a further matrix carried by the winding station;

a second tilting member operating between the winding station and the second transfer member in the second operating condition to engage the matrices carried by the winding station and by the second transfer member themselves and to exchange their position with one another with a 180° tilting motion.

OBJECTIVES OF THE PROCESS

According to the invention, the above machine executes a process for coiling and winding tubular sleeves in elastomeric material incorporating reinforcing fibers, characterized in that it comprises the following steps:

engaging of a matrix in a loading position on a rotating platform;

moving of the matrix, through rotation of the platform, from the loading position to a first position of withdrawal-storage;

transferring the matrix to a position side by side with and parallel to a coiling station;

engaging the matrix with a tilting member so as to transfer it, with a 180° tilting motion, onto the winding station;

winding on the matrix of at least one thread of reinforcing fiber, homogeneously distributed over the cylindrical surface of the matrix;

withdrawing the coiled matrix by means of the tilting member so as to disengage it, with a 180° tilting motion from the coiling station and simultaneously engaging on said station a new matrix previously transferred in a position side by side with and parallel to the coiling station itself;

transferring the coiled matrix onto the rotating platform, in the first position of withdrawal-storage;

transferring the coiled matrix, through a second angular rotation of the platform to a second position of withdrawal-storage;

transferring the coiled matrix in a position side by side with and parallel to a winding station;

engaging the coiled matrix by means of a second tilting member so as to transfer it, with a motion of rotation through 180°, onto the winding station;

winding onto the matrix of at least one sheet of elastomeric material; the winding onto the sheet of elastomeric material of at least one protective sheet of a paper material to obtain a wound tubular sleeve;

engaging the matrix carrying the wound sleeve with the second tilting member to remove it, with an angular rotation of 180°, from the winding station while simultaneously positioning in said station a coiled matrix previously transferred to a side by side position with respect to the winding station itself;

the transfer of the matrix carrying the wound sleeve onto the platform, in the second withdrawal-storage position;

moving the matrix having the wound sleeve, through the angular rotation of the platform, to an unloading position;

removing the matrix having the wound sleeve from the platform.

Further characteristics and advantages shall appear to a greater extent from the detailed description of a preferred but not exclusive embodiment of a machine and a process for coiling and winding sleeves in elastomeric material incorporating reinforcing fibers, according to the invention.

BRIEF DESCRIPTION OF THE DRAWINGS

Such description shall be made hereinafter with reference to the enclosed drawings, provided purely as an indication and thus with no limiting intent, wherein:

FIGS. 2 to 4 illustrate schematically a top plan view of the machine during different operating steps, in compliance with the process according to the invention.

DETAILED DESCRIPTION OF THE APPARATUS

Figure 1:
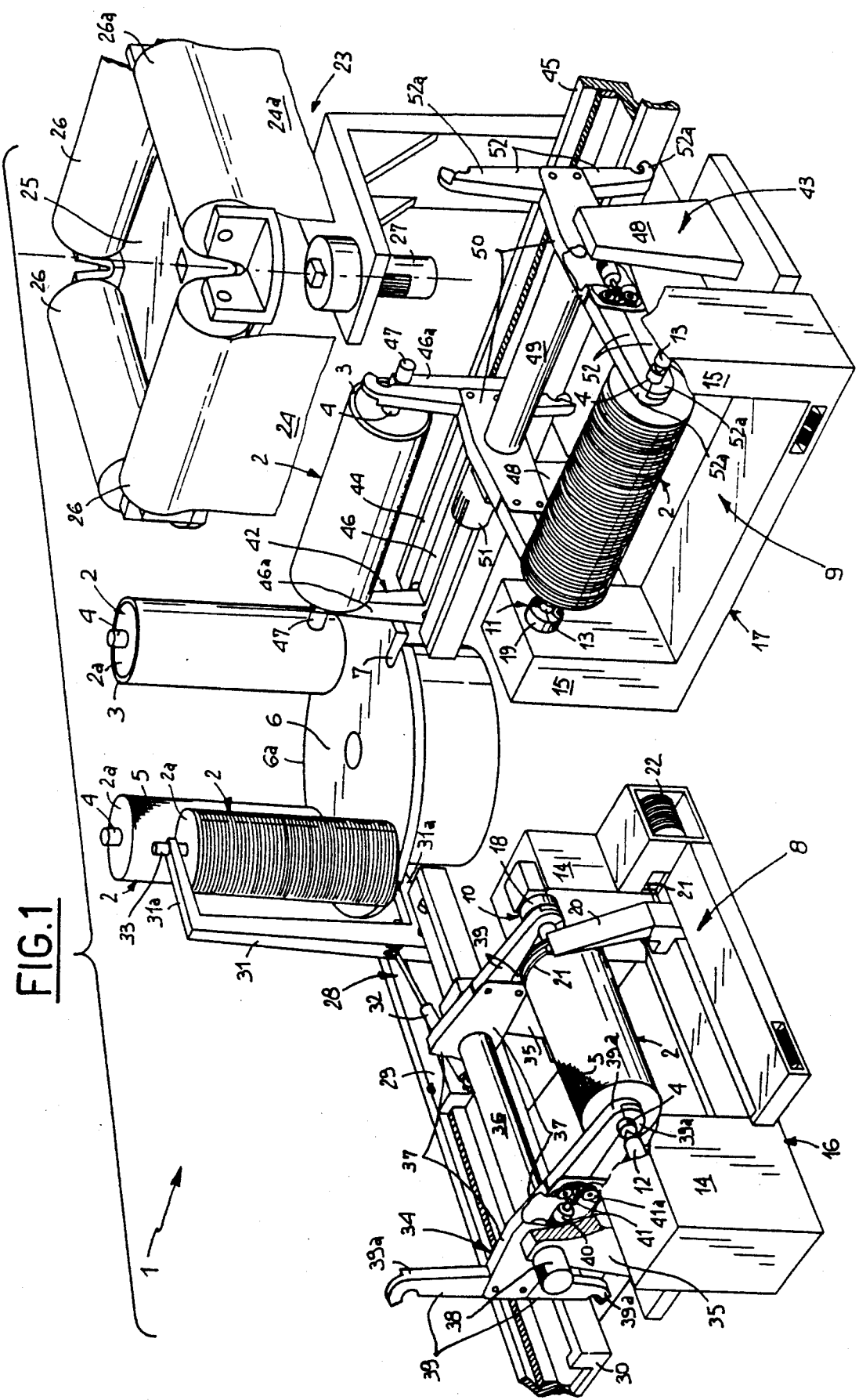
FIG. 1 is a perspective view of a coiling and winding machine according to the invention.

With reference to the mentioned figures, 1 indicates as a whole a machine for coiling and winding sleeves of elastomeric material incorporating reinforcing fibers, according to the present invention.

The machine 1 is arranged to operate on a plurality of matrices 2 of the type traditionally used for the formation of tubular sleeves 3 from which, with cutting operations executed after a curing process, transmission belts are obtained such as for example, toothed belts, V-belts or belts of other types.

Each matrix 2 has a substantially cylindrical configuration, from whose end surfaces 2a two connecting tangs 4 protrude coaxially.

In the embodiment described, where the tubular sleeves 3 are to be used in the making of toothed belts, it is provided for, in a known and traditional way, that on each matrix 2 there is previously slipped over it a tubular sleeve 5 made of a particular rubberized material extendable in the circumferential direction, so that it may adapt, during the curing step, to the profile of grooves (not visible in the figures) traditionally positioned along the matrix 2 itself to define the teeth of the belts to be obtained.

The matrices 2 being processed are subsequently engaged on a rotating platform 6 provided with a plurality of connecting seats 7 circumferentially distributed and arranged to engage one of the matrices.

More in particular, each connecting seat 7 is defined by a shaped recess on the outer circumferential edge 6a of the platform 6 and arranged so that it is slidably traversed by one of the connecting tangs 4 of the corresponding matrix.

Each matrix 2 is oriented in the vertical direction, with one of its end surfaces 2a resting on platform 6.

In the example illustrated, the platform 6 has four connecting seats 7, so that it can simultaneously engage four matrices 2 distributed according to an angular pitch of 90° on the axis of the platform itself.

At the four connecting seats 7, around platform 6, there are defined a loading position "A", a first withdrawal-storage position "B", a second withdrawal-storage position "C" and an unloading position "D".

A gear reduction unit, not illustrated as it is itself known and is in any case not important for the object of the invention, operates to cause rotation of the platform 6 on its own vertical axis according to an angular pitch equal to the distribution pitch of the connecting seats 7.

In this way each matrix 2 is ready to be carried successively to the different positions "A", "B", "C", "D" specified above, during the operating cycle of the machine 1, in the way that shall later better appear.

The matrices 2 engaged on the platform 6 are destined to be subsequently subjected to the process at a coiling station 8 and at a winding station 9 provided with first and second means of support and operation 10, 11, respectively, arranged, in a way itself known, to engage and operate in rotation the individual matrices 2, on a horizontal axis.

In a known way, the first and second means of support and operation 10, 11 comprise a pair of tailstocks 12, 13, respectively, coaxially aligned and in opposition, supported by a pair of uprights 14, 15 forming part of a supporting structure 16, 17 associated with the corresponding coiling station 8 or winding station 9.

The tailstocks 12, 13 can be moved closer to and farther away from one another from a release condition wherein they are at a distance greater than the maximum length of the individual matrices 2, to a grasping condition wherein they are closer to one another so as to support the matrix 2 at the clamping seats, (not shown) coaxially on the connecting tangs 4.

The first and second means of support and operation 10, 11, also comprise a self-centering chucks 18, 19 which are operated for rotation by a motor (not illustrated) and arranged to engage one of the connecting tangs 4 when the tailstocks 12, 13 are in the grasping condition so as to operate the corresponding matrix 2 in rotation.

The matrix 2 operated in rotation at a working position at the front of the coiling station 8 is subjected to the action of a known coiling unit 20, and of the traditional type and thus not further described, which is ready to slidably engage at least one thread 21 of reinforcing fiber, originally wound on a spool 22, to determine its winding onto the matrix itself distributing it homogeneously over the entire cylindrical surface of the sleeve on the matrix.

The matrix 2 mounted at a working position at the front of the winding unit 9 is, on the other hand, subjected to the action of a winding unit 23 which determines the winding, on the matrix itself, of at least one sheet 24 of elastomeric material.

As can easily be observed from FIG. 1, the winding unit 23 comprises a rotating turret 25 (represented only in FIG. 1 in an exploded view, for greater clarity), arranged in a position above the winding station 9 and operationally carrying a plurality of sheets 24 of elastomeric material, with different dimensional and/or functional characteristics, wound on respective rolls 26 arranged consecutively along the sides of a polygon.

The turret can be operated in rotation, by means of a ratiomotor 27, according to predetermined angles, so that the rolls 26 are selectively positionable in a parallel direction above the matrix 2 engaged by the second means of support and operation 11 provided for in the winding station.

The sheet 24 coming from the roll 26 above the matrix 2 is ready to be wound onto the matrix itself, following the rotation of the matrix of the chuck 19.

Preferably, at least one of the rolls, indicated by 26a, mounted on the rotating turret 25 consists of a protective sheet 24a of a paper material, which is ready to be wound in a traditional way onto the elastomeric sheet or sheets 24 previously associated with the matrix 2.

As can easily be observed from the enclosed figures, the coiling station 8 and the winding station 9 are arranged so as to substantially form a right angle, in the proximity of whose vertex the rotating platform 6 carrying the matrices 2 is arranged.

The movement of the individual matrices 2 from the rotating platform 6 to the coiling station 8 is executed with the aid of a first transfer member movable from a first operating condition wherein it engages the matrix 2 arranged in the first position of withdrawal-storage "B", to a second operating condition wherein said matrix is positioned side by side with and parallel to a further matrix 2 previously mounted on the coiling station 8.

For this purpose, the first transfer member 28 comprises essentially a first carriage 29 slidably engaged along a first guide structure 30 and movable, by means of a motor (not illustrated) from a first position wherein it is to one side of the rotating platform 6, aligned with one of the engagement seats 7, to a second position wherein it is substantially side by side with the coiling station 8.

With the first carriage 29 there is associated a first fork-like element 31 provided with two arms 31a spaced from one another by an amount greater than the maximum length of a matrix 2.

The fork-like element 31 is oscillatingly hinged onto the first carriage 29 at one of the above arms 31a and is movable, with a 90° rotation, by a fluid-dynamic actuator 32 or by equivalent means, from a first position wherein the free extremities of the arms 31a are aligned in a vertical direction, to a second position wherein said free extremities are aligned in a horizontal direction.

The first transfer member 28 also comprises a pair of first tailstocks 33 respectively engaging the free extremities of the arms 31a of the first fork-like element 31, in a relationship of reciprocal alignment.

The first tailstocks 33 are movable, by means of respective actuators, not visible in the enclosed figures, closer to and further away from one another from a release condition wherein they are at a distance greater than the maximum length of a matrix 2, to a grasping condition wherein they are slightly displaced one towards the other so as to engage the matrix 2 at the connecting tangs 4 associated with it.

The first transfer member 28 co-operates with a first tilting member 34 operationally arranged between the coiling unit 8 and the first transfer member itself when the latter is in the second operating condition.

The first tilting member 34 is arranged so as to engage simultaneously the matrices 2 carried by the coiling station 8 and by the first transfer member 28, respectively, to exchange their position with one another with a 180° tilting motion on a horizontal axis.

For this purpose, the first tilting member 34 comprises essentially a pair of first fixed uprights 35, aligned in a direction parallel to the axis of the matrix mounted on the coiling station 8 and rotatably supporting a connecting shaft 36 arranged along a coplanar axis, parallel to and equidistant from the axes of the matrices 2 carried by the first transfer member 28 in the second operating condition and by the coiling station 8, respectively.

The tilting member 34 further comprises two pairs of first tilting arms 37 which extend in opposite directions from the extremities of the connecting shaft 36 and are simultaneously rotatable through 180° on the axis of the connecting shaft 36.

This rotation can be actuated, say, by at least one main motor 38 operating between one of the fixed uprights 35 and the connecting shaft 36.

On the free extremity of each of the tilting arms 37 there is mounted a first clamping member 39 having two first connecting elements 39a rotatably engaged with the tilting arm 39 and are simultaneously movable closer to and away from one another in a clam-like or pliers movement from a release condition wherein they are reciprocally at a distance from one another, to a grasping condition wherein they are closer to one another so as to engage one of the tangs 4 at the end of matrix 2. On the rear side of shaft 36 only the left hand pair of clamping arms is shown. The right hand pair on the rear side have been omitted for the sake of clarity so that other parts can be seen.

The clam-like opening and closing operation of each first clamping member 39 can be obtained, for example, by means of an auxiliary motor 40 fastened to the corresponding tilting arm 37 and operating on a worm-screw 41 operationally engaged with a pair of helical wheels 41a each integral with one of the first connecting elements 39a.

Referring now to winding station 9, in a manner similar to what has been said with reference to the coiling station 8, the transfer of the individual matrices 2 from the rotating platform 6 to the winding station 9 is executed by means of the co-operation of a second transfer member 42 with a second tilting member 43.

The second transfer member 42 is movable from a first operating condition wherein it engages the matrix 2 arranged in the second withdrawal-storage position "C" on the platform 6, to a second operating condition wherein said matrix is positioned side by side with and parallel to a further matrix 2 carried by the winding station 9.

For this purpose, as previously stated with reference to the first transfer member 28, the second transfer member 42 also comprises essentially a second carriage 44 movable, along a second guide structure 45, in a direction parallel to the axis of the matrix 2 mounted on the winding station 9, from a first position wherein it is to one side of the platform 6, to a second position wherein it is side by side with the second tilting member 43.

On the second carriage 44 there is mounted, with the possibility of oscillation through 90° on a horizontal axis, a second fork-like element 46 having two second arms 46a at whose free extremities there are operationally mounted second tailstocks 47 movable so as to get closer to and farther away from one another in order to obtain the engagement and disengagement of the matrix 2.

The second tilting member 43 is also structurally identical with the first tilting member 34 previously described, and thus comprises a pair of second fixed uprights 48 aligned along a direction parallel to the axis of the matrix 2 mounted on the winding station 9, between which there is rotatably engaged a second connecting shaft 49 arranged along a coplanar axis, parallel to and equidistant from the axis of the matrices 2 carried by the second transfer member 42 in the second operating condition and by the winding station 9, respectively.

With the second connecting shaft 49 there are associated two pairs of second tilting arms 50 simultaneously rotatable through 180° on the axis of the connecting shaft itself, by a respective main motor 51 and each provided with a second clamping member 52 consisting of a pair of second connecting elements 52a simultaneously movable in a clam-like or pliers manner closer to and farther away from one another.

PROCESS OF OPERATION

After the above prevalently structural description, the operation of the present machine 1, in compliance with the process according to the invention, is as follows.

The matrices 2 on which the tubular sleeves 3 are to be wound are individually engaged with the rotating platform 6 at the loading position "A".

During this step, the matrix 2 to be engaged with the platform 6 is simply arranged with one of its end surfaces 2a resting on the platform itself, so that the corresponding connecting tang 4 is inserted in the engagement seat 7.

As previously mentioned, the matrix 2 engaged with the rotating platform 6 can already be provided with a rubberized material sleeve 5 slipped over its cylindrical surface, or it can also be provided for that such sleeve 5 is slipped over the matrix 2 when the latter is already engaged by the platform 6.

With a rotation of 90° of the platform 6, in an anticlockwise direction with respect to the enclosed figures, the matrix 2 is carried from the loading position "A" to the first withdrawal-storage position "B".

Figure 2:
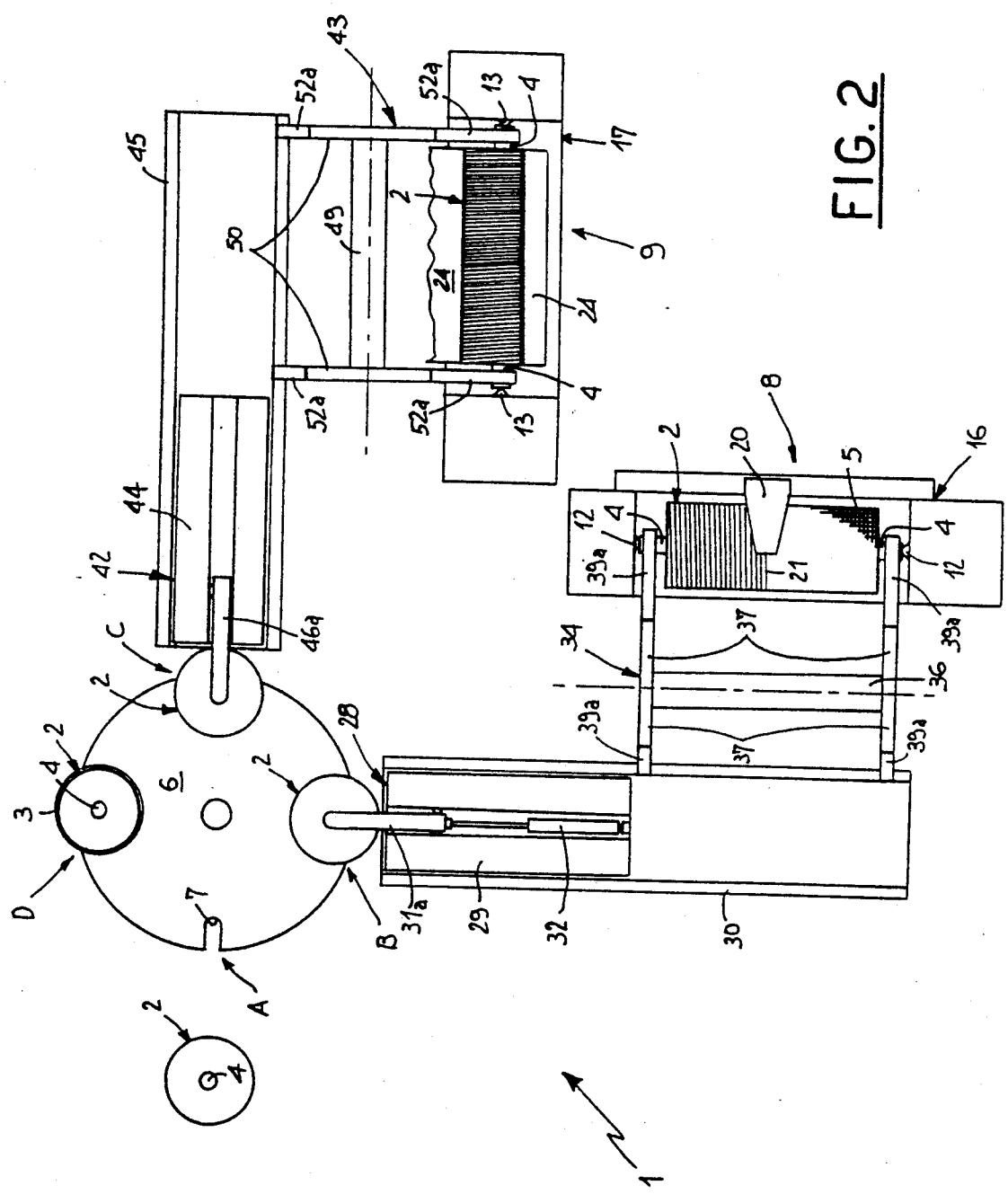

In this situation, as can be seen from FIG. 2, the matrix is ready to be engaged by the first transfer member 28 to be carried in engagement onto the coiling station 8.

More in particular, it is provided for that the first transfer member 28 be arranged in the first operating condition, so that the extremities of the arms 31a carried by the first fork-like element 31 be side by side with the connecting tangs 4 of the matrix 2, as per FIG. 1.

The first tailstocks 33, initially held in position at a distance, are brought closer together so as to determine the engagement of the matrix with the connecting tangs 4, after which the fluid-dynamic actuator 32 determines a tilting movement through 90° of the first fork-like element 31, so that the matrix 2 is disengaged from the platform 6 and is arranged along a horizontal orientation.

The first carriage 29 then moves away from the platform 6, so that the first transfer member 28 as a whole is arranged in the second operating condition, as per FIG. 3.

At this point the first connecting elements 39a carried by the first tilting arms 37 facing the first transfer member 28 are brought towards one another and closed in a pliers-like movement to engage the matrix carried by the first transfer member 28.

The matrix 2, disengaged from the first transfer member 28 by the moving away of the first tailstocks 33, is then transferred by a 180° tilting movement, onto the coiling station 8, at which the matrix itself is operationally engaged by the first means of support and operation 10, to be subjected, subsequently, to the winding of the thread 21 of the reinforcing fiber homogeneously distributed by the action of the coiling unit 20.

As can be clearly perceived from FIG. 4, simultaneously with the transfer of the above matrix 2 by the first transfer member 28 to the coiling station 8, another matrix 2 previously coiled and earlier engaged by the first connecting elements 39a of the tilting member 34, is transferred from the coiling station 8 to the first transfer member 28, which is in its second operating condition.

The matrix 2, having coils wound thereon is withdrawn from the coiling station 8 simultaneously with the transfer of the new matrix 2 onto the station itself, is again transferred onto the platform 6, in the first withdrawal-storage position "B", by means of the first transfer member 28, according to an operational sequence substantially the opposite to that described above with reference to the operation of withdrawal from the platform itself. That is the matrix having the coils wound thereon is preferably pivoted through a 180° arc from the front of the coiling station 6 to the rear of the coiling station 8 by swinging through the bottom half of a circle while simultaneously a fresh matrix, not yet coiled, is swung through the top half of the same circle, or vice versa. It is also contemplated that the return swing could be the reverse of the initial swing, that is both being over the top half of the circle.

Returning to refer to FIG. 2, the rotating platform 6 is made to rotate again through an angle of 90°, so that the coiled matrix 2 is taken to the second withdrawal-storage position "C".

At the same time, a new matrix 2 previously engaged on the platform 6 in the loading position "A" is carried to the first withdrawal-storage position "B", to be withdrawn by the first transfer member 28 and transferred onto the coiling station 8 by the first tilting member 34.

The coiled matrix 2 arranged in the second withdrawalstorage position "C" is ready to be withdrawn by the second transfer member 42, which is in the corresponding first operating condition.

The coiled matrix 2, which is transferred to be in alignment with the winding station 9 by rotation of platform 6 is engaged between the second tailstocks 47 of the second fork-like element 46 and is then rotated to be horizontal and transferred to a position side by side with respect to the winding station 9.

The coiled matrix 2 is thus ready to be engaged by the second connecting elements 52a carried by the pair of second tilting arms 50 facing the second transfer member 42.

With the rotation through 180° of the tilting arms 50 associated with the second tilting member 43, the changeover of position is obtained between the coiled matrix 2, carried by the second transfer member 42, and a matrix 2 that has already been wound, simultaneously withdrawn from the winding station 9, as per FIG. 4.

The coiled matrix 2, carried onto the winding station 9, is operationally engaged by the second means of support and operation 11, which cause it to rotate on its own axis to allow the application of at least one of the sheets of elastomeric material 24, coming from one of the pre-selected rolls 26, carried by the rotating turret 25.

In FIG. 1 the turret 25 appears to be slightly back from the winding station 9 but this is only to show clearly all of the parts. In actual construction the turret is directly above the winding station, that is, the roll 26a to be used will be in substantially in alignment and above the matrix 2 being wound.

At the end of the application of the elastomeric sheet 24, which is executed in a known and traditional way and is thus not described in detail, the turret 25 is made to rotate so as to arrange onto the matrix 2 being processed a roll 26a carrying protective sheet 24a of a paper material, to allow the latter's winding by at least one turn onto the matrix itself.

At the end of this operation the matrix 2 carrying the finally wound elastomeric tubular sleeve 3, is withdrawn, again under the action of the second tilting member 43, from the winding station 9 to exchange its position with a new coiled matrix 2, previously carried to a relationship of engagement with the second tilting member itself under the action of the second transfer member 42.

The matrix 2 carrying the sleeve 3 is engaged onto the second transfer member 42 to be taken back onto the platform 6 in the second withdrawal-storage position "C".

With a further angular rotation of the platform 6, the matrix 2 carrying the wound sleeve 3 is transferred to the unloading position "D" (FIG. 2), to be moved finally away from the machine 1 (FIG. 3) and taken to an autoclave where, in a known and traditional way, the curing process of the tubular sleeve 3 is to take place.

The present invention attains the above objectives. The machine 1 very satisfactorily carries out the winding of the reinforcing fibers and the application of the sheets of elastomeric material and of a paper material by means of a coiling unit and a winding unit which operate in a manner that is totally independent from one another.

In this way, as can be clearly perceived from the above description, the coiling unit and the winding unit have the possibility of operating non-stop and simultaneously on several matrices without it being necessary, as occurs in the known art, to alternate the operation of each of the above units.

It should also be observed that, thanks to the method adopted for the transfer of the matrices into the coiling and winding stations, any dead time necessary for the transfer of the individual matrices from one operating station to another are to all intents and purposes eliminated.

It should in actual fact be considered that the only dead time which occurs in the operation of the present machine is represented by the interval of time necessary for the changeover of the matrices to occur on the individual operating stations under the action of the tilting members.

During the execution of the processes on the matrix mounted on the coiling station or on the winding station, the transfer member withdraws a new matrix from the platform and arranges for it to be transferred onto the coiling or the winding station by means of the corresponding tilting member.

Moreover, the above described solution allows a reduction of the costs of the entire machine since, in relation to two machines each provided with a coiling and winding part, there is in this case only one coiling unit 20 instead of two with the consequent advantage also as regards the space required and the possibility of uniform pull on the cords for all the sleeves.

Naturally, numerous changes and variants may be made to the invention thus conceived, all falling within the scope of the inventive concept which characterizes it.

We claim:

1. A machine for coiling and winding tubular sleeves of elastomeric material incorporating reinforcing fibers said machine including:

means to engage and rotate on a horizontal axis a cylindrical matrix, on which the sleeve is to be formed;

a coiling unit for applying reinforcing fiber to wind it and distribute it homogeneously over the matrix during rotation thereof; and a winding unit for feeding and winding onto the matrix at least one sheet of elastomeric material during rotation of said matrix, said machine comprising:

a coiling station carrying the coiling unit and provided with first means for rotation of the matrix;

a winding station carrying said winding unit and provided with second means for rotation of the matrix;

a rotating platform positioned adjacent both said coiling station and said winding station and having means to engage a plurality of said matrices at respective connecting seats distributed circumferentially on the platform according to a predetermined angular pitch, said platform being mounted for incremental rotation on a vertical axis according to an angular pitch equal to the distribution pitch of the connecting seats;

a first transfer member movable from a first operating condition wherein it engages a first one of the matrices carried by said platform to a second operation condition wherein said first matrix engaged by said first transfer member is positioned side by side with and parallel to a second matrix carried by the coiling station;

a first tilting member operating between the coiling station and the first transfer member in the second operating condition, to engage a second matrix carried by the first transfer member and to exchange the positions of said first and second matrices with one another through a 180° tilting motion;

a second transfer member movable from a first operating condition wherein it engages said second matrix previously processed in the coiling station and returned to the platform by the first transfer member, to a second operating condition wherein said second matrix is positioned side by side with and parallel to a third matrix carried by the winding station;

a second tilting member operating between the winding station and the second transfer member in the second operating condition to engage the second matrix carried by the second transfer member and to exchange the positions of said second and third matrices with one another through a 180° tilting motion.

2. A machine according to claim 1, in which said coiling station and said winding station are arranged so as to substantially form a right angle with a vertex, said rotating platform being positioned in a proximity of said vertex.

3. A machine according to claim 2, in which said platform has four connecting seats, distributed at an angular pitch of about 90°, each one of said seats engaging one of said matrices.

4. A machine according to claim 1, in which each of said connecting seats is a shaped recess on the external circumferential edge of the rotating platform and arranged so that it is slidably traversed by a connecting tang of a matrix, each of the matrices carried by the platform being vertically oriented with one of the end surfaces of the matrix resting on the platform itself.

5. A machine according to claim 4, in which said first transfer member comprises:

a first carriage slidably guided in a direction parallel to a longitudinal axis of a matrix mounted on the coiling station, and movable from a first position wherein the first carriage is to one side of the rotating platform, aligned with one of said engagement seats, to a second position wherein the first carriage is substantially side by side with the coiling station;

a first fork-like element provided with two arms spaced from one another by an amount greater than a maximum length of a matrix, each arm having a free extremity, said fork like element being oscillatingly hinged onto the first carriage and movable, through a 90° rotation, from a first position wherein the free extremities of said two arms are aligned along a generally vertical direction, to a second position wherein said free extremities are aligned along a generally horizontal direction;

a pair of first tailstocks respectively carried by the free extremities of the arms, in a relationship of reciprocal alignment and means for moving said tailstocks closer to and farther away from one another from a release condition wherein they are at a distance greater than the maximum length of a matrix, to a grasping condition wherein they are closer to one another so as to engage a matrix at connecting tangs on said matrix 6. A machine according to claim 1, in which said first tilting member comprises:

a pair of first fixed uprights, aligned in a direction parallel to a longitudinal axis of a matrix mounted on the coiling station;

a first connecting shaft rotatably engaged between the first fixed uprights, along a coplanar axis, parallel to and equidistant from the axes of matrices carried by the first transfer member in the second operating condition and by the coiling station, respectively;

two pairs of first tilting arms which extend in opposite directions from the connecting shaft and are mounted to be simultaneously rotatable through 180° rotations on an axis of the connecting shaft;

a plurality of first clamping members each of which is mounted at an end one of the first tilting arms and has two first connecting elements rotatably engaged with the tilting arm and means for simultaneously moving said connecting element closer to and farther away from one another from a release condition wherein they are reciprocally at a distance from one another to a grasping condition wherein they are closer to one another so as to engage a connecting tang on one of the matrices.

7. A machine according to claim 4, in which said second transfer member comprises:

a second carriage slidably guided in a direction parallel to a longitudinal axis of a matrix mounted on the winding station, and movable from a first position wherein the second carriage is to one side of the rotating platform, aligned with one of said engagement seats, to a second position wherein the second carriage is substantially side by side with the second tilting member;

a second fork-like element provided with two second arms spaced apart at a distance greater than a maximum length of a matrix, each arm having a free extremity, said fork-like element being oscillatingly hinged onto the second carriage and movable, through a 90° rotation, from a first position wherein the free extremities of said arms are aligned along a generally vertical direction, to a second position wherein said free extremities are aligned along a generally horizontal direction;

a pair of second tailstocks respectively carried by the free extremities of the arms, in a relationship of reciprocal alignment and means for moving said tailstocks closer to and farther away from one another from a release condition wherein they are at a distance greater than the maximum length of a matrix, to a grasping condition wherein they are moved closer to one another so as to engage a matrix at connecting tangs on said matrix.

8. A machine according to claim 1, in which said second tilting member comprises:

a pair of second fixed uprights, aligned in a direction parallel to a longitudinal axis of a matrix mounted on the winding station;

a second connecting shaft rotatably engaged between said fixed uprights, along a coplanar axis, parallel to and equidistant from the axes of the matrices carried by the second transfer member in the second operating condition and by the winding station, respectively;

two pairs of second tilting arms which extend in opposite directions from the connecting shaft and are mounted to be simultaneously rotatable through 180° rotations on an axis of the connecting shaft;

a plurality of second clamping members each of which is mounted at an end of one of the second tilting arms and has two second connecting elements rotatably engaged with the tilting arm and means for simultaneously moving said second connecting elements closer to and farther away from one another from a release condition wherein they are reciprocally at a distance to a grasping condition wherein they are closer to one another so as to engage a connecting tang one of the matrices.

9. A machine according to claim 1, in which said winding unit comprises a rotating turret carrying a plurality of sheets of elastomeric material wound on respective rolls arranged according to a polygonal configuration, said turret being rotatable according to predetermined angles to select the individual elastomeric sheets to be applied on a matrix being processed.

10. A machine for manufacturing a fiber reinforced tubular elastomer sleeve on a cylindrical matrix comprising:

a coiling station having a working position with means for rotating a matrix and applying a fiber reinforcing material thereto;

a winding station having working position with means for rotating a matrix having said fiber reinforcing material thereon and applying at least one layer of elastomeric material over said fiber reinforcing material;

a rotatable platform positioned between said coiling station and said winding station, said platform having means at its periphery for receiving and holding a plurality of said matrices in a generally vertical position;

a transfer means at each of said coiling and winding stations for moving a matrix from its generally vertical position on said platform to a generally horizontal position at said station;

each of said coiling station and said winding station having a tilting member with two pairs of arms for carrying two of said matrices, one being positioned to be worked upon at a station and the other being received from said transfer means;

an arrangement of the stations and the platform being such that a movement of a tilting member will carry a matrix to be worked upon from the transfer means to the working position while simultaneously carrying a completed matrix from the working position to the transfer means and a single partial rotation of said platform will move a fresh matrix to said coiling station while simultaneously moving a completed coiled matrix from said coiling station to said winding station.

* * * * *